Figure 1:
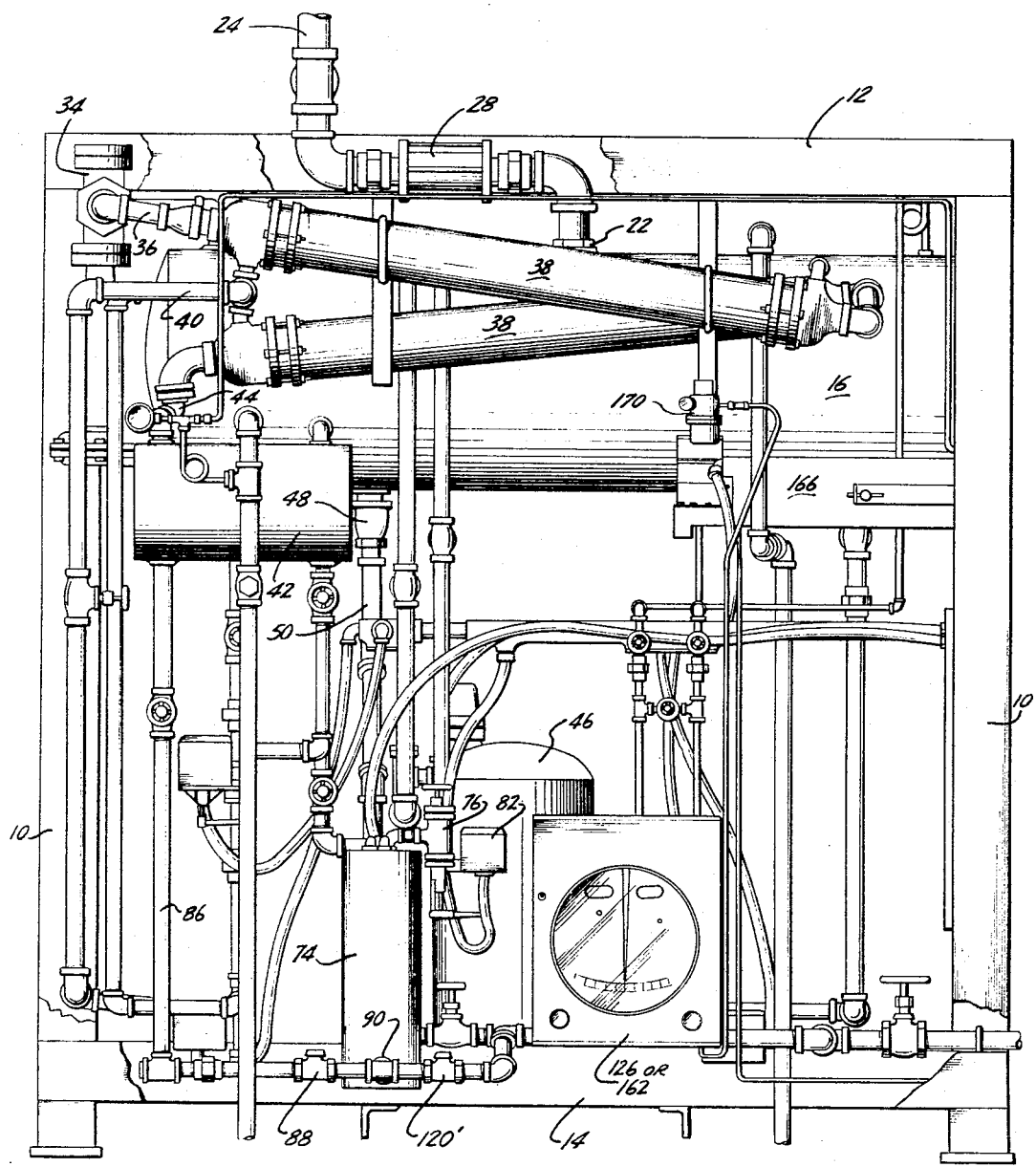

United States Patent Office 3,324,710
Patented June 13, 1967

3,324,710
CONDENSATE METERING UNIT
Donald L. Calkins, Three Rivers, Mich., and John W. Hieronymus, deceased, late of Boca Raton, Fla., by First National Bank of Palm Beach, executor, Palm Beach, Fla., assignors to The Johnson Corporation, Three Rivers, Mich., a corporation of Michigan
Filed Feb. 24, 1964, Ser. No. 347,340
8 Claims. (Cl. 73—29)

The invention pertains to a steam condensate metering unit, and a method of metering the amount of steam condensate and steam vapor "blow-through" removed from a steam-heated apparatus, such as a drier drum.

In steam-heated apparatus wherein steam is employed as a heating medium, condensate continually forms within the apparatus and its removal is required to maintain an acceptable efficiency of heat transfer or exchange. The problem of condensate removal becomes very important in dynamic steam-heated apparatus, such as a drier drum, as employed in the manufacture of paper, and the like. In such applications a large cylindrical drum is rotatably supported upon journals, at least one of which is hollow, and rotated by motor means. Steam is introduced into the drum through the hollow journal, and the condensate forming within the drum is likewise removed from either the same, or the other journal. In a paper-making machine, for instance, a great number of such steam-heated drums are employed to dry the paper to the proper moisture content. The paper web, or strip, engages the outer periphery of the drum, for a portion of its circumference, whereby the heat of the drum will be transferred to the paper. As the paper-making process is continuous, the time of contact for a given section of paper with a single drum is very small, in that the modern paper mill operates at high speeds. However, by the use of a large number of drums, the desired drying of the paper is produced.

As the condensate forms within the drier drums, its presence therein produces several objectionable problems. In a paper-making machine which is operating at slower speeds, the condensate forms a "puddle" in the lower regions of the drum, and considerable power requirements are necessary to rotate the drum against the frictional effect of this puddle. Siphon pipe means within the drum are usually employed to remove the condensate as quickly as possible. However, in the "stationary" siphon pipe arrangement, wherein the siphon pipe does not rotate with the drier drum, it is necessary to maintain considerable clearance between the siphon pipe intake end and the inner drum surface. Thus, the complete elimination of the "puddle" is not possible.

It has been the tendency in recent years for paper manufacturers to operate their paper mills at capacities much greater than previously. Such an increase in capacity is largely provided by increasing the velocity of the paper movement through the mill. As the paper velocity increases, the rotational speeds of the drier drums must likewise increase, as the peripheral drum speed must be equal to the velocity of the paper web, or strip, as it passes over the drums. When the drier drums rotate at the higher speeds now being employed with many paper mills, the condensate within the drum, due to the high drum rotational speed, will "rim" within the inner surface of the drum, rather than form a "puddle" in the bottom of the drum. Such condensate "rimming" is due to the fact that the centrifugal force imposed upon the condensate is sufficient to maintain the condensate against the entire drum inner shell forming a film distributed over the entire inner drum surface. The presence of this condensate film is objectionable in that it insulates the drum shell from the steam therein, and adversely affects the transfer of heat between the steam and the drum. "Rimmed" condensate is best removed by the use of a rotating siphon pipe within the drum. In a rotating siphon pipe, the intake end, or pickup shoe end, of the siphon pipe is held in engagement with the inner surface of the drum, and the entire siphon pipe rotates with the drum. Rotary joint means are interposed between the rotating siphon pipe structure within the drum and the stationary siphon conduit system outside of the drum transferring the condensate to a receiver.

Whether the condensate is in the form of a "puddle" or is "rimmed," the intake or pickup shoe end of the siphon pipe within the drum attempts to remove the condensate as fast as it forms. However, from a practical standpoint, it is not possible to entirely remove the condensate, and the efficiency of different siphon systems between various manufacturers to effectively remove the condensate significantly varies. Variations in the ability of siphon means to function effectively are produced by the structural characteristics of the siphon pickup shoe, the relation of the shoe to the inner drum surface, the location of the pickup shoe within the drum, and various other factors. Commonly employed siphon pickup shoes locate the siphon intake very close to the inner drum surface, so that upon the condensate reaching a depth which permits the condensate to enter the siphon pickup shoe, the shoe will remove the condensate at the condensate surface. It will be appreciated that differential pressure conditions exist within the drum and the siphon pipe whereby the condensate will flow into the siphon pipe upon entering its intake end. Whether the siphon pickup shoe is of a continuous removal type, such as is most commonly employed, and which removes the condensate at its surface, or a "bucket" or "scoop" siphon shoe is employed which removes the condensate by batches, it is most difficult to prevent the entrance of uncondensed steam vapor into the siphon system. Such introduction of "blow-through" steam vapor into the siphon system is due to the fact that the condensate surface will often become irregular, or where a "scoop" removal system is used the siphon intake will be directly exposed to the steam vapor during a substantial portion of each rotation of the drum. Generally, the removal of uncondensed steam vapor from the drum is objectionable in that such "blow-through" steam vapor has not been employed in the drum heating process, and for all practical purposes is wasted.

It is a basic object of the invention to provide an apparatus and method for testing condensate removal systems of steam-consuming or steam-heating apparatus wherein both condensate and steam vapor are removed from the steam-heated apparatus. By analyzing the amount of condensate and the amount of steam vapor removed from the steam-consuming apparatus in a given time, it is possible to determine the efficiency of the siphon removal system operating under known conditions. Thus, by the use of the invention it is possible to employ equipment and drum operating conditions which will produce optimum operating characteristics, and improve the efficiency of the steam-consuming apparatus.

It is an object of the invention to provide a steam condensate metering unit and metering method wherein the analyzing of the condensate of a single drier drum, of a battery of drier drums, may take place under the same siphon system pressure conditions as the drier drums not being tested, whereby the efficiency of the siphon system of a drum may be accurately determined under operating conditions.

Another object of the invention is to provide a condensate metering unit and metering method wherein predetermined pressure conditions may be maintained between the interior of the steam-consuming apparatus, such as a drier drum, and the siphon system therefor, wherein the pressures providing optimum efficiency of the dried drum may be determined.

A further object of the invention is to provide a steam condensate metering unit and metering method wherein, although both liquid condensate and steam vapor are removed from steam-consuming apparatus, an accurate determination of the amount of liquid condensate and steam vapor removed may be made. In accord with the invention, this measurement is produced by a volumetric measurement of the liquid condensate removed, and the steam vapor removed from the steam-consuming apparatus is condensed wherein the steam vapor is changed to a liquid condensate, the volume of which may also be accurately measured.

Yet another object of the invention is to provide a condensate metering unit which is portable, and may be employed to test steam-consuming apparatus, in situ, without major modification to the apparatus.

Figure 2:
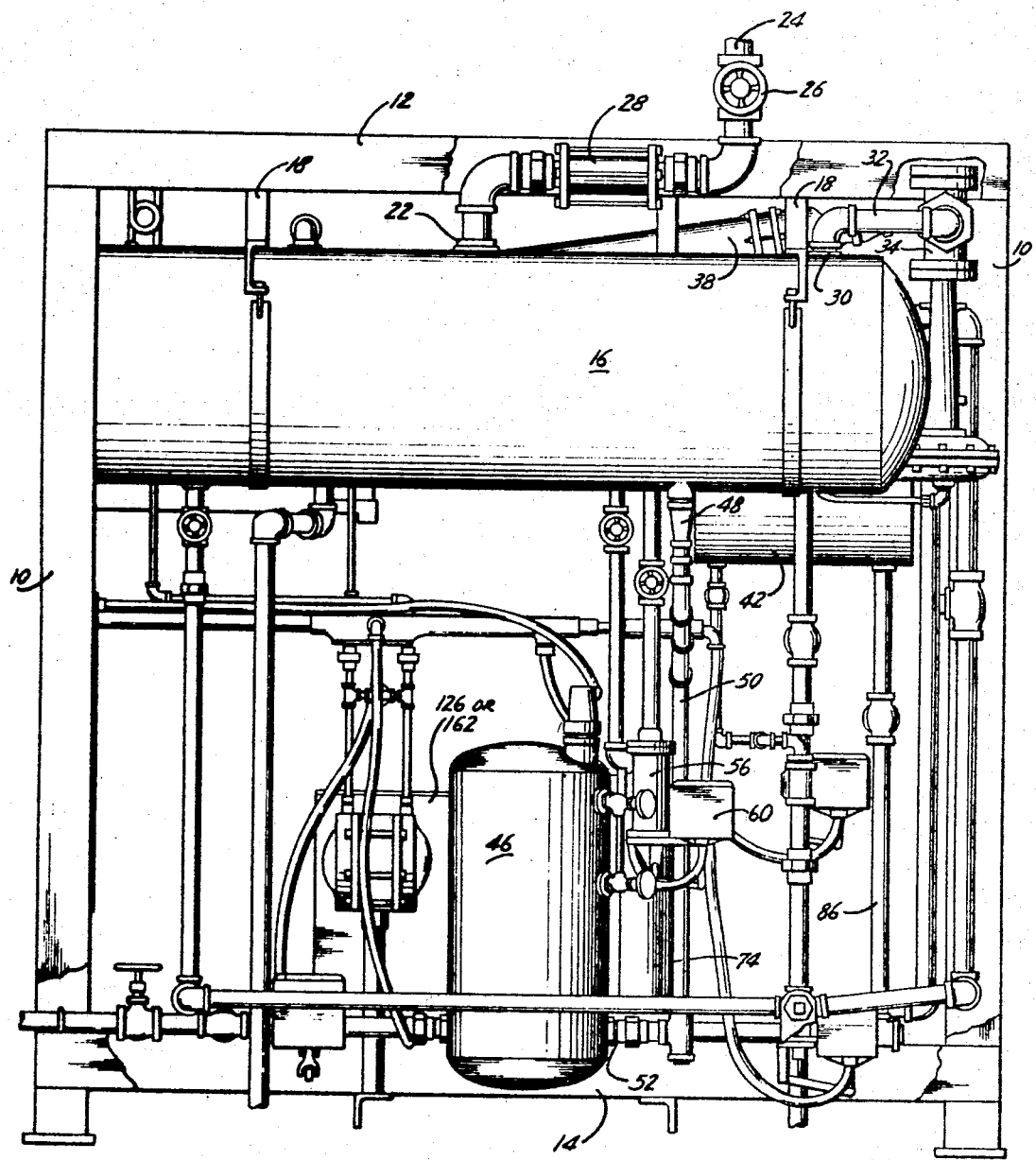
Figure 3:
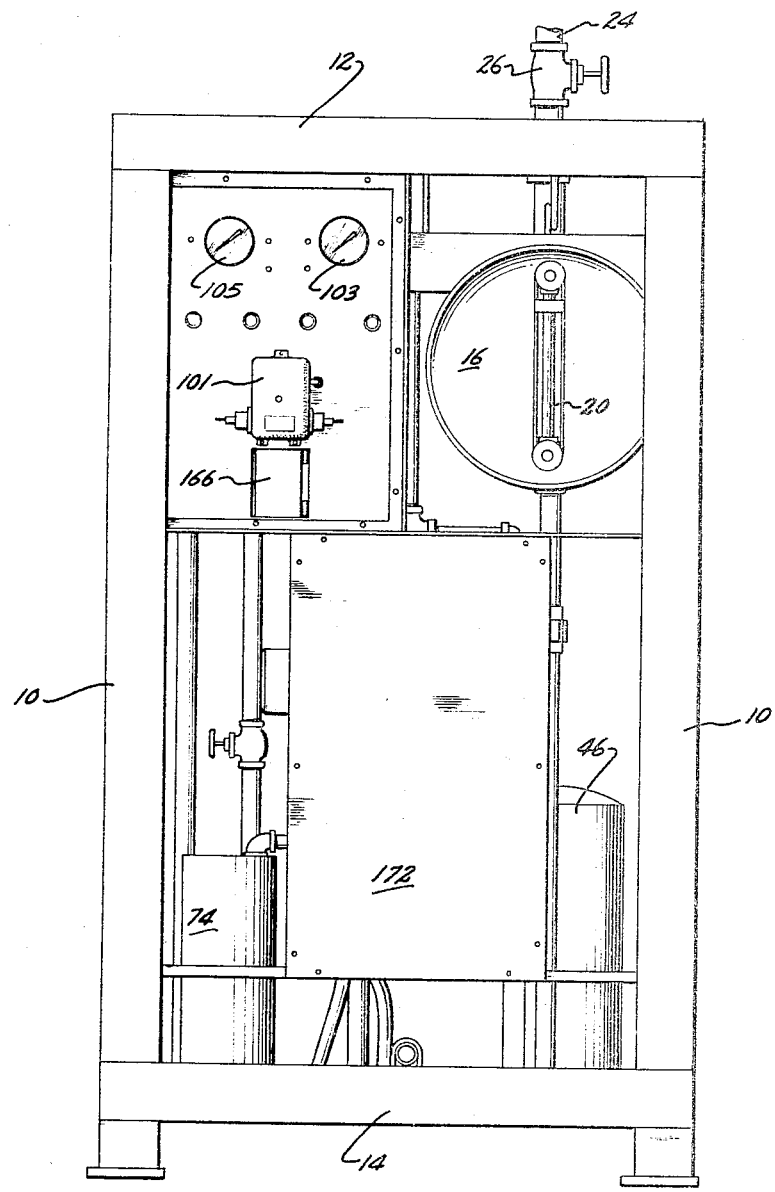
Figure 4:
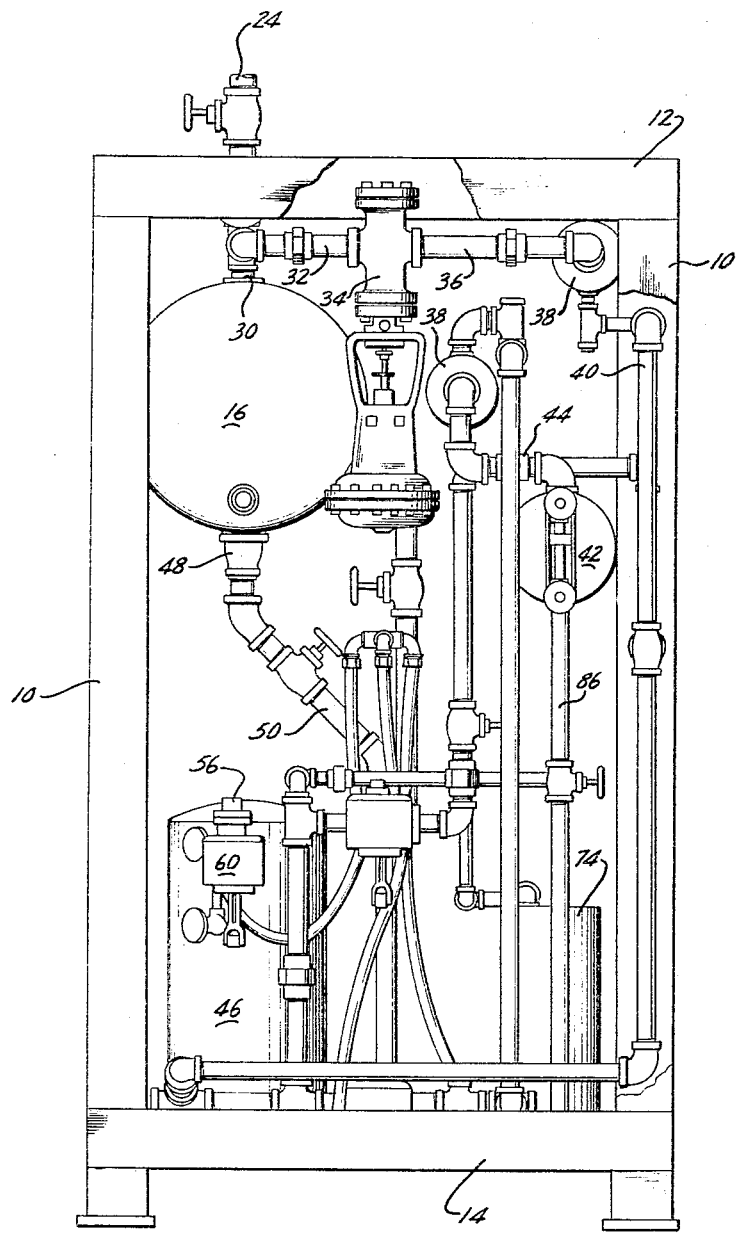
Figure 5:
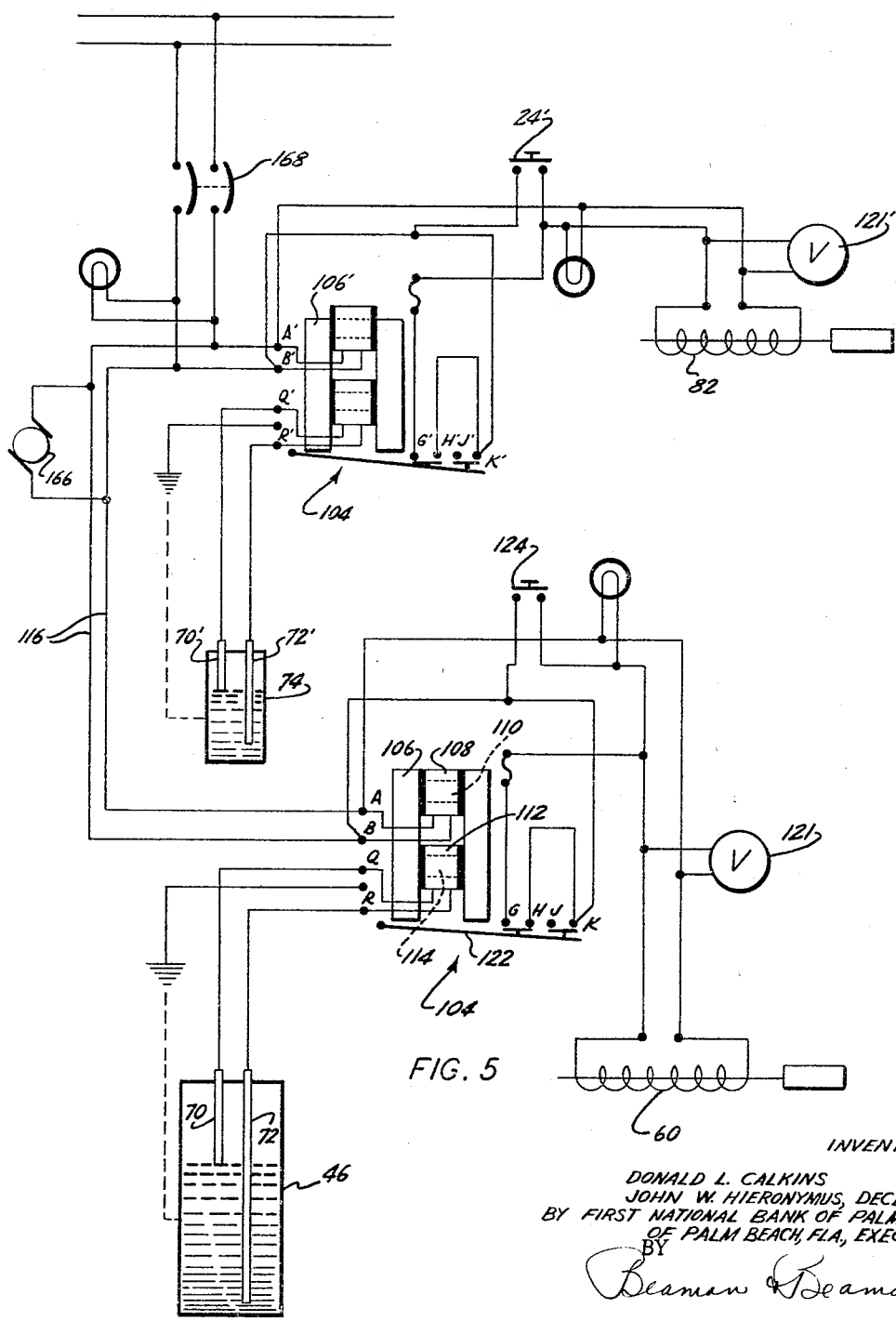
Figure 6:
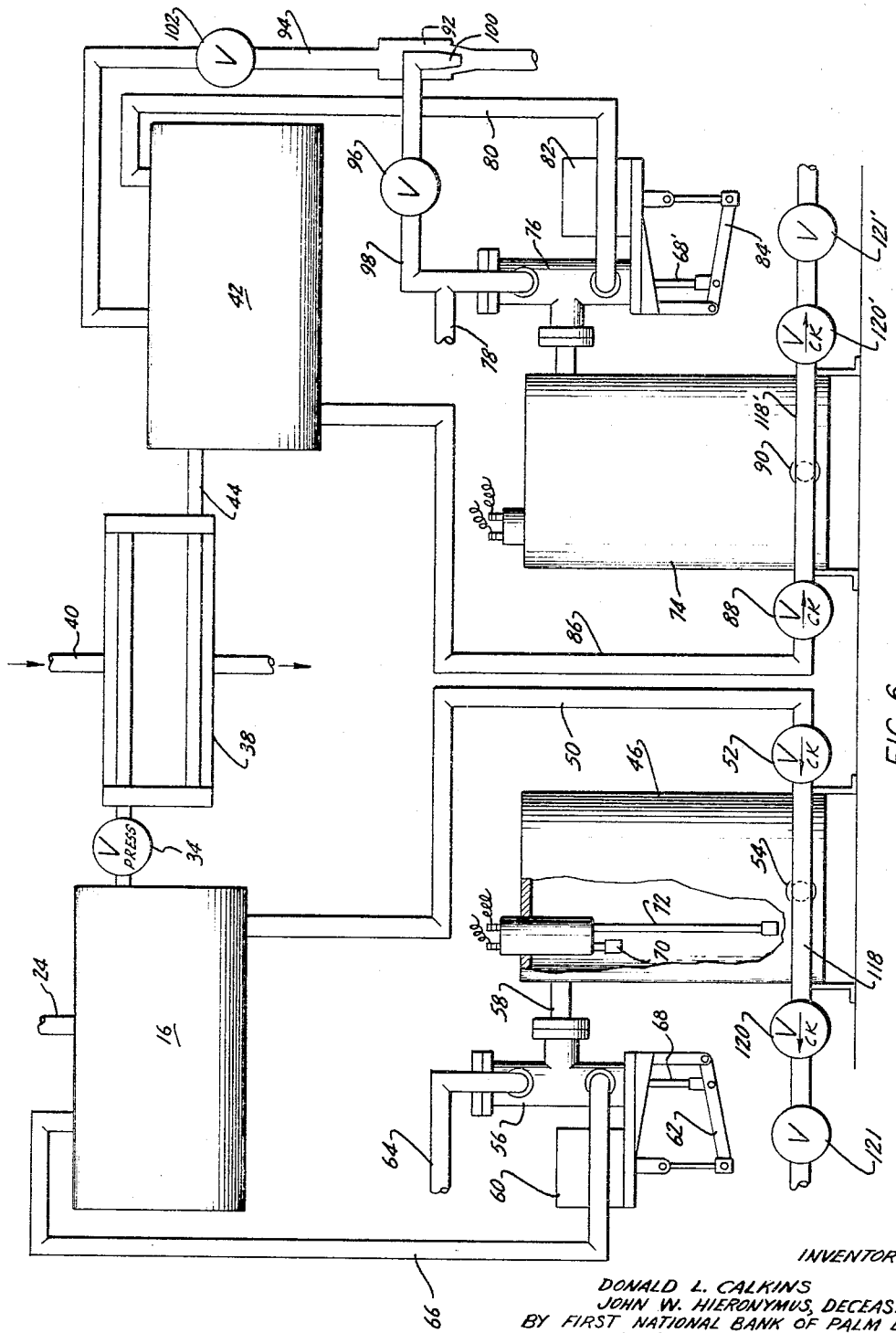
Figure 7:
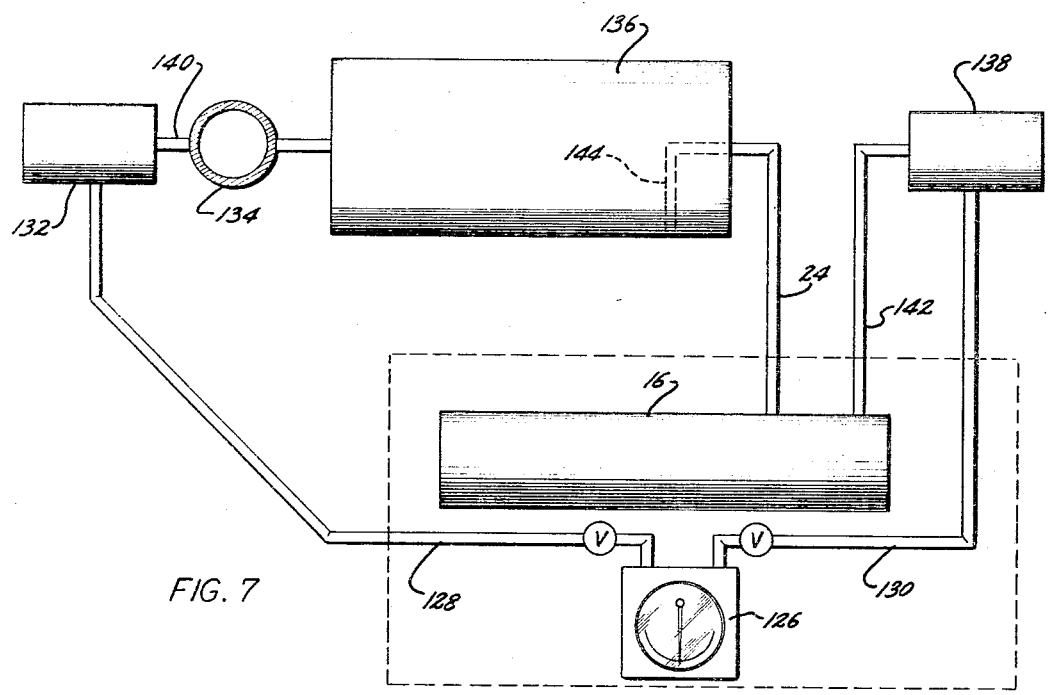
Figure 8:
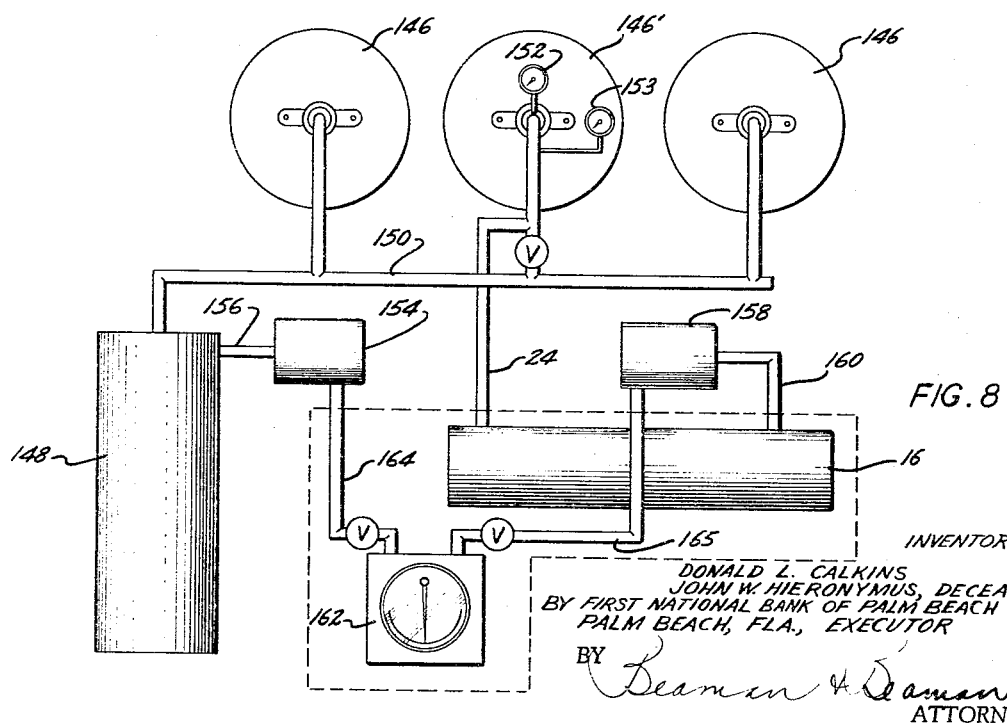

These and other objects of the invention arising from the details and relationships of components of an embodiment thereof will be apparent from the following description and accompanying drawings wherein:

FIG. 1 is a front, elevational view, partly sectioned, of a condensate metering unit in accord with the invention, FIG. 2 is an elevational, partly sectioned view of the back of the condensate metering unit, FIG. 3 is an elevational view of the condensate metering unit taken from the right of FIG. 1, FIG. 4 is an elevational end view of the metering unit taken from the left of FIG. 1, FIG. 5 is an electrical diagram of the basic electrical circuit employed with the condensate measuring devices, FIG. 6 is a schematic view of the basic fluid circuit of the condensate metering unit, FIG. 7 is a schematic layout view of the metering unit as employed under differential pressure conditions with the intake manifold of a steam drier drum, and FIG. 8 is a schematic layout view of the metering unit arrangement as employed in testing the characteristics of a single drier drum, which is one of a series of drums, under actual operating conditions.

As will be best appreciated from FIGS. 1 through 4, the condensate metering unit, in accord with the invention, is located within an open box-like frame consisting of vertical angle members 10, disposed in a rectangular relationship, interconnected at the top by angle members 12 and at the bottom by angle members 14. The lower ends of the vertical members 10 extend below the lower angle members 14 to form legs for the metering unit. In its actual form the metering unit is of such a size that it may be readily transported about by a conventional fork lift truck and, thus, is considered portable.

Within the frame a primary condensate and "blow-through" steam vapor receiver 16 is suspended from the upper members 12 by brackets 18. The receiver 16 consists of a tank having a sight glass 20 at one end, FIG. 3, and is provided at the top with an inlet fitting 22. The condensate and steam vapor removed from the apparatus being tested are introduced into the receiver 16 through a conduit 24 having a valve 26 which is connected to the inlet fitting 22 by appropriate plumbing fixtures, which include a transparent section 28, whereby the condensate flow into the receiver 16 may be observed.

The receiver 16 is also provided with a steam vapor outlet fitting 30, located at the top of the receiver, which is connected via conduits 32 to an air-operated control valve 34. Conduits 36 communicate with the control valve 34 and direct the steam vapor to surface condensing means, which condense the "blow-through" steam vapor to a liquid condensate. In the disclosed embodiment, the steam vapor condenser consists of a pair of cylindrical jackets 38, connected in series, which are provided with a cooling water by conduit 40, FIG. 1, which cools heat exchanger means within the jackets 38 to condense the steam vapor. The steam vapor condenser may be of any surface type wherein all of the steam vapor will be condensed, yet is not diluted by the cooling water. After the steam vapor has been condensed in the jackets 38, the steam vapor condensate flows to a receiver 42 via conduit 44, FIG. 1.

The measurement of the condensate directly received from the steam-consuming apparatus, and that produced by the condensation of the steam vapor and collected in received 42, is preferably produced by volume measuring means. While many types of conventional volume measuring means, which are capable of automatic operation, may be employed, the measurement apparatus preferably consists of a return trap, currently being manufactured and marketed by the assignee. This measurement means is commercially known as a "Johnson Electrap," manufactured by the Johnson Corporation of Three Rivers, Mich., and shown in its Bulletin ET-6. A very similar apparatus, although employing pump means, is shown in United States Patent No. 2,153,117 of the assignee.

The liquid condensate directly received by the receiver 16 from the steam-consuming apparatus is introduced into the measuring container 46 through a receiver outlet 48, formed in the bottom of the receiver 16, a conduit 50, and a check valve 52, FIGS. 2 and 6. Through a conduit 54 the condensate is introduced into the lower region of the container 46, and as the container 46 is located below the receiver 16, the condensate will flow by gravity from the receiver 16 to the container 46. A valve 56 communicates with the upper region of the container 46 by a conduit 58, and is operated by an electric solenoid 60 activating a linkage 62. Valve 56 communicates with a steam inlet conduit 64 and a vent conduit 66. Depending on the position of the valve stem 68, as operated by the linkage 62, either the steam conduit 64 or the vent conduit 66 will communicate with the container 46 via the conduit 58. The vent conduit 66 communicates with the top of the receiver 16, and the steam conduit 64 communicates with an outside steam source for producing a pressure within the container for forcing the measured condensate to a drain and thereby emptying the container. As shown in FIGS. 5 and 6, a pair of electrodes are located within the container 46, the electrode 70 being a short electrode having a lower end terminating adjacent the upper region of the container and the electrode 72 being of such length that the lower end terminates adjacent the bottom of the container 46.

A similar condensate measuring container 74 is employed in conjunction with the steam vapor condensate receiver 42. The container 74 has a valve 76 associated therewith in communication with a steam source conduit 78 and a vent conduit 80 communicating therewith. The valve 76 is operated by the electric solenoid 82 by means of linkage 84. The vent conduit 80 communicates with the top of the receiver 42, and the steam conduit 78 communicates with the same steam source as the steam conduit 64. Conduit 86 connects receiver 42 to container 74 via check valve 88 and conduit 90.

Although it is rarely required, a Pemberthy ejector 92 is employed in conjunction with the vapor condensate receiver 42 to produce a vacuum therein to start the cycle, if necessary, and insure that adequate pressure differential occurs between the receivers 16 and 42 to produce the desired operation. The ejector 92 communicates with the top of the receiver 42 by means of a conduit 94, and communicates with a steam source by means of valve 96 and conduit 98, whereby a nozzle 100 may be used to produce the desired pressure differential to create a vacuum within the receiver 42. Valves 96 and 102, associated with the ejector, will normally remain closed and may be of the solenoid-operated type. It is desirable that the operation of the ejector 92 be fully automatic and, to this end, a Minneapolis-Honeywell Standard Differential Pressuretrol No. P406A1009 is employed. The Pressuretrol unit 101 may be mounted upon a control panel, FIG. 3, and, by means of suitable tubing, senses the pressure within the receivers 16 and 42. The Pressuretrol is preset to operate should the pressure differential between the receivers fall below a predetermined value and, in such instance, will energize the solenoids of valves 96 and 102 to place the ejector 92 in operation to re-establish the desired pressure differential between receivers 16 and 42. Pressure gages 103 and 105 indicate the pressures within the receivers 16 and 42, respectively.

With reference to FIGS. 5 and 6, the operation of the containers 46 and 74, being identical, will be explained with regard to the larger container 46. A relay is associated with each circuit of the measuring containers to control the solenoid-operated valve associated therewith and sense the liquid level within the associated tank. The relay 104 includes an "A" core 106 having a primary coil 108 associated with an upper bar 110 and a secondary coil 112 encompassing a lower bar 114 which is associated with the electrode circuit. An alternating current supply is provided at the terminals A and B through a pair of supply conductors 116 which energize the primary coil and set up a magnetic flux which follows the lines of least resistance and circulates through the bar 114 and induces a current in the secondary coil 112. No current will be flowing through the circuit of the secondary coil until it is closed.

With reference to container 46, the condensate will flow through the conduit 50 and check valve 52 into the container via conduit 54. The flow of condensate through the drain conduit 118 and check valve 120 is prevented by a solenoid-operated valve 121. When the condensate level in the container 46 reaches the short electrode 70, the secondary circuit of coil 112 is completed, as current will flow from the secondary coil to the short electrode and through the condensate to ground and back to the coil. Upon the closing of the secondary circuit, a bucking action is produced in the lower bar 114 of the core which acts to divert lines of magnetic force to the core legs. This results in a strong magnetic force at the ends of the legs which pulls armature 122 into contact with the core legs to close the electrode circuit at terminals Q and R and the load circuit at terminals G and H. This operation will energize the solenoid 60 to shift the valve stem 68 to the position wherein the steam within conduit 64 is introduced into the upper portion of the container 46, forcing the condensate from the container into the drain conduit 118, through check valve 120 and valve 121, which opened upon energization of the circuit to solenoid 60. As the short electrode 70 is also connected to contact Q, the secondary circuit will not be opened until the water level falls below the long electrode 72.

After the container 46 has drained to the point where the condensate level has fallen below the long electrode 72, the secondary circuit will be broken and the relay 104 will open, thereby de-energizing solenoid 60 and shifting the valve stem 68 to the original position which establishes communication between the vent conduit 66 and the top of the container 46. Valve 121 will also close at this time. Thus, the condensate within the receiver 16 may again flow into the container 46 and thereby repeat the cycle. The operation of container 74 is similar, and equivalent components are indicated by primes.

As the amount of condensate received within the containers 46 and 74 is known for each cycle of operation, by merely counting the cycles of filling and emptying of the containers 46 and 74 by automatic counters, not shown, the amount of condensate and steam vapor received within the receiver 16 may be accurately determined for any given time interval. A push-button switch 124 is employed for manually emptying container 46 at the beginning of a cycle, and a pilot light may be employed to indicate operation of the solenoids. Primed reference numerals indicate similar components on the circuit for the relay for container 74.

In order to accurately evaluate the efficiency of a siphon system so that the percent of condensate and "blow-through" steam vapor may be compared, predetermined pressure conditions must be maintained between the receiver 16 and the pressure systems associated with the steam-consuming apparatus employing the siphon system. For instance, if it is desired to evaluate the characteristics of a siphon system of a single drier drum, which is one of a series of drier drums connected to a common condensate receiver, it is necessary to establish pressure conditions within the receiver 16 equal to the pressure within the common condensate receiver employed with the drier drums not being tested, in order to evaluate the efficiency of the drum being tested with relation to the complete set of drums and under normal operating conditions.

Should it be desired to determine the optimum steam pressure with which a given drum is to be provided to produce maximum operating efficiency, it is desirable to establish known pressure conditions between the steam being introduced into a given drum and the siphon system for that drum. Accordingly, a predetermined pressure differential between the receiver and the header providing steam to the desired drum should be maintained.

To set up a test situation as described in the immediately preceding paragraph, an arrangement such as shown in FIG. 7 is employed. In this instance a direct differential control transmitter 126 is employed with the metering unit to regulate the control valve 34. For this purpose a Minneapolis-Honeywell differential pressure transmitter 237N1-C2-11-111-1V-L may be employed. This type of transmitter requires a sensing conduit 128 and a sensing conduit 130. In setting up the apparatus for a direct differential control test, an equalizing tank 132 is employed which is in communication with the steam header 134 providing the drum 136 to be tested with steam. Likewise, an equalizing tank 138 is located at a vertical position equal to that of the tank 132, and the tanks 132 and 138 are partially filled with water. Each equalizing tank is provided with an air-bleed valve so as to be air free.

The tank 132 communicates with the transmitter 126 by means of the conduit 128 and the header by conduit 140, whereby the pressure within the steam header 134 may be accurately sensed by one side of the transmitter sensing means. The tank 138 communicates with the receiver 16 via conduit 142, and as the tanks are at equal vertical positions, any pressure differential between the tanks due to head pressures is eliminated. Such an arrangement is necessary in that the drier drum being tested is usually located considerably above the metering unit installation. The transmiter 126 is connected to the tank 138 by the conduit 130. Thus, the transmitter 126 will sense both the pressure of the steam header 134 and that of the receiver 16.

As the transmitter 126 may be regulated to produce any desired differential pressure between the steam being introduced into the drier drum 136 and the receiver 16, the transmitter is adjusted to sense the desired differential pressure and the transmitter, by means of conventional control means, regulates the air pressure being supplied to the diaphram control valve 34 to control the pressure within receiver 16 and maintain the desired differential pressure between the drum and receiver. The control valve 34 may be of the type manufactured by the Minneapolis-Honeywell Company identified as Type 12 of Series 800-R, and the air control means between the transmitter and control valve may be of the conventional nature used between such components, and therefore need not be explained in detail.

Under the direct differential control described above, the percentage of liquid condensate and steam vapor condensate "blow-through" removed from the drum 136 through siphon 144 under any given pressure differential for a given time interval may be determined. It will be appreciated that by varying the differential pressure between the drum and the receiver 16, the optimum pressure differential for producing the most efficient operation of the drum may be readily determined.

To test a drier drum which is operating under normal conditions, the arrangement shown in FIG. 8 is employed. In this construction wherein a plurality of drier drums 146 are interconnected to a common condensate receiver 148 by means of a trunk line 150, the drum 146' to be tested is temporarily disconnected from the trunk line 150, and its siphon system is connected to the metering unit receiver 16 by conduit 24. Steam gauge 152 and siphon pressure gauge 153 may also be connected to drum 146'. An equalizing tank 154 is attached to the common condensate receiver 148 by conduit 156, and the equalizing tank 158 is located at the same vertical position as the tank 154, communicating with the receiver 16 via conduit 160. A zero-center indicating differential pressure transmitter 162 is employed in the metering unit to sense the pressures within the tanks 154 and 158. The tank 154 communicates with one side of the transmitter 162 via a conduit 164. Thus, one side of the transmitter will be sensitive to the pressure within the common condensate receiver 148. The other side of the transmitter is in communication with the tank 158 via conduit 165 to sense the receiver 16 pressure. The transmitter 162 may be of the type manufactured by the Minneapolis-Honeywell Company identified as Y224N1(C2), and is so constructed as to operate air control means regulating the control valve 34 to maintain equal pressures between the receiver 16 and the common condensate receiver 148. Under this arrangement, the siphon pressure conditions of the drum 146' being tested will be identical to the pressure of the common siphon system of drums 146. Thus, an accurate determination of the efficiency of the siphoning system of drum 146' may be made under actual operating conditions.

As it is desirable that a record be made of any unusual pressure fluctuations, when operating under either of the described test situations, a motor driven recorder 166, such as a Minneapolis-Honeywell Tel-O-Set No. 723X22N3–R3–111–51–B1 may be connected to either the zero-center or the direct differential control transmitter, depending on which type of transmiter is being used, to indicate if any undesirable pressure fluctuations occurred during the test period. As the test period usually extends over a number of hours, the use of such a recorder is an aid in obtaining accurate test results. A main switch 168 energizes the recorder motor, as well as the circuit for the rest of the metering unit.

A standard Minneapolis-Honeywell Tel-O-Set controller No. 822A1B–16 may be used in conjunction with the recorder 166 and is indicated at 170.

A cabinet 172 is mounted upon the metering unit frame to house the necessary electrical connections, and is provided with a cover which may be removed to provide access to the cabinet.

From the above described operation of the metering unit, it will be apparent that the percentage of liquid condensate and steam vapor "blow-through" removed from steam-consuming apparatus in a given time interval, may be very accurately determined, and that the efficiency of the siphon system may be readily evaluated. By the use of the invention, differences between the effectiveness of the various manufacturers' siphon equipment, as used with a given drier drum, may be readily determined, and other factors affecting the efficiency of a drier drum, or other steam-heated apparatus, may be adjusted in accord with the findings available from a condensate metering unit evaluation.

The FIGS. 1 through 4 illustrate an actual embodiment of the metering unit of the invention, and portions of the plumbing illustrated have not been described in detail as only those interconnections involved during the operation of the device, while metering, are significant to the invention. Conduits for drains, steam, air and cooling water appear in FIGS. 1 through 4, and it is considered to be within the scope of one skilled in the art to position and interconnect these conduits in the manner of FIGS. 5 through 8 to produce a metering unit capable of the above described operation.

It is understood that various embodiments to the invention may be apparent to those skilled in the art without departing from the spirit and scope of the invention, and it is intended that the invention be limited only by the scope of the following claims:

What is claimed is:

1. A metering unit for steam-consuming apparatus wherein both condensate and steam vapor are removed from said apparatus comprising, in combination, a condensate and steam vapor receiver having an inlet communicating with the steam-consuming apparatus and receiving the condensate and vapor removed therefrom, a condensate outlet defined in said receiver, a vapor outlet defined in said receiver, first condensate measuring means in communication with said receiver condensate outlet, vapor-condensing means, means interconnecting said receiver vapor outlet and said vapor-condensing means, a control valve controlling vapor flow from said receiver to said vapor-condensing means thereby regulating the pressure within said receiver, pressure responsive regulating means communicating with said apparatus and said receiver and controlling said control valve maintaining a predetermined pressure within said receiver, and second condensate measuring means in communication with said vapor-condensing means measuring the amount of steam vapor condensed.

2. A metering unit for steam-heated apparatus employing siphon means for removing the condensate therefrom wherein steam vapor is also removed from said apparatus by the siphon means, said siphon means adapted to operate at known pressure conditions comprising, in combination, a condensate and steam vapor received in communication with said siphon means and receiving the entire discharge thereof, a condensate outlet defined in said receiver, a vapor outlet defined in said receiver, first condensate measuring means in communication with said receiver condensate outlet, vapor-condensing means, a vapor condensate receiver communicating with said vapor-condensing means, conduit means interconnecting said receiver vapor outlet and said vapor-condensing means, a control valve interposed in said conduit means controlling vapor flow from said receiver to said vapor-condensing means, control valve regulating means sensing said known pressure and the pressure within said receiver and regulating said control valve to substantially equalize the receiver pressure to said known pressure, and second condensate measuring means in communication with said vapor condensate receiver measuring the amount of steam vapor condensed.

3. A metering unit for steam-heated apparatus employing siphon means for removing the condensate therefrom wherein steam vapor is also removed from said apparatus by the siphon means, said steam-heated apparatus being supplied with steam through steam supply means comprising, in combination, a condensate and steam vapor receiver in communication with said siphon means and receiving the entire discharge thereof, a condensate outlet defined in said receiver, a vapor outlet defined in said receiver, first condensate measuring means in communication with said receiver condensate outlet, vapor-condensing means, a vapor condensate receiver in communication with said vapor-condensing means, conduit means interconnecting said receiver vapor outlet and said vapor condensing means, a control valve interposed in said conduit means controlling vapor flow from said receiver to said vapor-condensing means, control valve regulating means sensing the pressure of said steam supply means and said receiver and regulating said control valve, said regulating means maintaining a predetermined pressure differential between said supply means and said receiver, and second condensate measuring means in communication with said vapor condensate receiver measuring the amount of steam vapor condensed.

4. In combination with a steam-heated hollow drier drum having steam inlet means and siphon means for removing condensate therefrom, steam vapor also being removed from said drum through said siphon means, a condensate and steam vapor receiver in communication with said siphon means and receiving the entire discharge thereof, a condensate outlet defined in said receiver, a vapor outlet delned in said receiver, first condensate measuring means in communication with said receiver condensate outlet, vapor-condensing means, a vapor condensate receiver communicating with said vapor-condensing means, conduit means interconnecting said receiver vapor outlet and said vapor-condensing means, a control valve interposed in said conduit means controlling vapor flow from said receiver to said vapor-condensing means, control valve regulating means regulating said control valve and sensing pressure conditions normally associated with said drier drum and sensing the pressure within said receiver maintaining predetermined pressure conditions between said sensed pressures, and second condensate measuring means in communication with said vapor condensate receiver measuring the amount of steam vapor condensed.

5. In combination with a steam-heated drier drum as in claim 4, wherein said regulating means senses the steam pressure at said drum steam inlet means and maintains a predetermined pressure differential between said drum steam inlet means and said receiver.

6. In combination with a steam-heated drier drum as in claim 4, wherein said drum is one of a series of drier drums, a common condensate receiver receiving the condensate of said series of drums, said regulating means sensing the pressure of said common condensate receiver and maintaining the pressure within said condensate and vapor-receiving receiver substantially equal to the pressure of said common condensate receiver.

7. In combination with a steam-heated drier drum as in claim 4, wherein continuous pressure-recording means are associated with said control valve regulating means continuously recording the operation of said regulating means.

8. In combination with a steam-heated drier drum as in claim 4, vacuum-producing means communicating with said vapor condensate receiver, and means for selectively energizing said vacuum-producing means.

References Cited
UNITED STATES PATENTS

| | | | |
|---|---|---|---|
| 494,057 | 3/1893 | Carpenter | 73—192 |
| 1,609,423 | 12/1926 | Packard | 73—192 X |
| 2,541,102 | 2/1951 | Rymal | '73—425.6 |

RICHARD C. QUEISSER, *Primary Examiner.*

E. D. GILHOOLY, *Assistant Examiner.*